(12) United States Patent
Makinadjian

(10) Patent No.: US 7,720,582 B2
(45) Date of Patent: May 18, 2010

(54) ACTIVE SUSPENSION METHOD AND APPARATUS FOR A ROTARY WING AIRCRAFT

(75) Inventor: Brice Makinadjian, Saint-Marc Jaumegarde (FR)

(73) Assignee: Eurocopter, Marignane (FR)

(*) Notice: Subject to any disclaimer, the term of this patent is extended or adjusted under 35 U.S.C. 154(b) by 1180 days.

(21) Appl. No.: 11/188,725

(22) Filed: Jul. 26, 2005

(65) Prior Publication Data
US 2007/0032931 A1 Feb. 8, 2007

(30) Foreign Application Priority Data
Aug. 12, 2004 (FR) .................... 04 08843

(51) Int. Cl.
B60G 17/018 (2006.01)

(52) U.S. Cl. .................. 701/37; 701/3; 244/100 R; 244/102 R; 244/104 R; 244/99.8

(58) Field of Classification Search ............. 701/37; 244/17.17
See application file for complete search history.

(56) References Cited

U.S. PATENT DOCUMENTS

| | | | |
|---|---|---|---|
| 3,716,208 A * | 2/1973 | Fagan et al. | 244/108 |
| 4,142,698 A | 3/1979 | Niebanck et al. | |
| 4,519,559 A | 5/1985 | Logan et al. | |
| 4,730,816 A * | 3/1988 | Eckert | 267/64.11 |
| 5,231,583 A * | 7/1993 | Lizell | 701/37 |
| 5,276,622 A * | 1/1994 | Miller et al. | 701/37 |
| 6,092,011 A * | 7/2000 | Hiramoto | 701/37 |
| 6,120,009 A | 9/2000 | Gatehouse et al. | |
| 6,885,917 B2 * | 4/2005 | Osder et al. | 701/3 |

FOREIGN PATENT DOCUMENTS
GB 1 279 981 A 6/1972

* cited by examiner

Primary Examiner—Mark Hellner
Assistant Examiner—Helal A Algahaim
(74) Attorney, Agent, or Firm—Young Thompson

(57) ABSTRACT

In a method of controlling the hardness of a damper in an aircraft landing gear, the aircraft having a structure that is deformable at a natural frequency, the hardness of the damper is adjusted during a contraction of the damper as a function of the natural frequency.

13 Claims, 1 Drawing Sheet

ACTIVE SUSPENSION METHOD AND APPARATUS FOR A ROTARY WING AIRCRAFT

FIELD OF THE INVENTION

The present invention relates to an active suspension method and apparatus for a rotary wing aircraft.

The technical field of the invention is that of manufacturing suspension systems for helicopters.

The present invention applies to aircraft landing gear, in particular for rotorcraft, serving to improve the performance thereof in the event of a hard landing or a crash landing.

BACKGROUND OF THE INVENTION

Various systems have already been described for adapting the stiffness and/or the hardness of damping in a vehicle suspension.

U.S. Pat. No. 4,730,816 describes an apparatus for controlling the hardness of a suspension for a road vehicle; the apparatus has two chambers interconnected by a pipe fitted with an electromagnetically controlled valve having two constrictions, and a hydropneumatic accumulator acting as a spring; the single valve is fast, and it influences the hardness both of the spring and of the damper as a function of signals delivered by sensors to an electronic apparatus that controls the position of the valve. The hardness of damping is measured at all times and its desired value is calculated by the electronic apparatus, which value is then applied to the control valve; the hardness of damping and of the suspension can vary as a function of the state of the road, the state of the load, the acceleration of the vehicle, or the speed of the vehicle, e.g. in application of a servo-control relationship that reduces the hardness of the suspension at slow speed.

U.S. Pat. No. 5,276,622 describes a system for controlling variation in the damping coefficient of a damper for the purpose of avoiding end-of-stroke knocks.

U.S. Pat. No. 6,120,009 describes a shock absorber for an aircraft landing gear of length, stiffness, and damping hardness that are variable as a function of signals delivered by sensors to an electronic apparatus controlling three valves that control the flow rate of fluid entering or leaving one of the chambers of the shock absorber; the sensors may be sensitive to operating parameters of the damper such as the speed of its piston, to operating parameters of the airplane such as its speed, and/or to parameters of the landing gear.

The document "Testing of semiactive landing gear control for general aviation aircraft" by Gian Luca Ghiringhelli, Journal of Aircraft, Vol. 37, No. 4, July-August 2000, pp. 606-616, proposes mathematical models for the behavior of landing gear tires and dampers, and describes experiments for validating those models and their applications to controlling a valve for controlling the hardness of a damper.

U.S. Pat. No. 6,474,598 describes an oleopneumatic damper for landing gear including an electromagnetic coil for controlling the viscosity of a magneto-rheological oil flowing from one chamber of the damper to the other.

SUMMARY OF THE INVENTION

An object of the invention is to propose an improved active suspension system for an aircraft; an object of the invention is to remedy the drawbacks and shortcomings of prior art aircraft suspension systems.

An object of the invention is to provide an improved method and apparatus for the suspension of a rotary wing aircraft, and in particular for a helicopter.

An object of the invention is to propose helicopter landing gear with servo-controlled damping adapted to the helicopter, and/or adapted to hard landings (and/or to crash landings).

An object of the invention is to propose an aircraft fitted with an improved system for servo-controlling the hardness of landing gear.

The invention applies in particular to helicopters having an airframe or central structure supporting a main rotor and at least one engine unit; the helicopter also comprising a tail boom connected to the central structure and supporting a tail rotor.

In accordance with an aspect of the invention, the hardness of a damper of landing gear of the aircraft is servo-controlled as a function—in particular—of data representative of the period corresponding to the natural frequency of deformation of the structure of the aircraft.

In other words, and in accordance with another aspect of the invention, a method of controlling the hardness of an aircraft landing gear damper is proposed, for an aircraft having a structure that is deformable with a natural mode of deformation and at a natural frequency, in which method said hardness is adjusted during a contraction (or compression) of the damper, as a function of said natural frequency.

According to preferred embodiments:

a force transmitted by the landing gear to the deformable structure is measured, and said hardness is adjusted as a function of the measured transmitted force;

alternatively—or in addition—it is possible to measure a rate of compression of the damper, and to adjust said hardness as a function of the measured rate of compression;

for a damper presenting two fluid chambers communicating via a duct fitted with a valve of variable aperture, the aperture of the valve is caused to vary so as to vary the hardness of the damper;

the hardness of the damper is adjusted to spread out the energy of a landing impact over a duration close to the reciprocal of said natural frequency;

a servo-control relationship for opening a variable aperture valve of the damper is selected and/or generated as a function of parameters for the current landing; and in order to select or generate said relationship, use is made of recorded and/or measured data relating to the trim of the aircraft, the vertical speed of the aircraft, the lift of the aircraft, the mass of the aircraft, the position of the center of gravity of the aircraft, the position of the landing gear of the aircraft, the stiffness of the landing gear of the aircraft, and the drive linkage of the landing gear of the aircraft.

In other words, and according to another aspect of the invention, apparatus is proposed for servo-controlling the hardness of a landing gear damper of an aircraft having a structure that presents at least one natural frequency of deformation; the apparatus includes a system for adjusting said hardness and/or a force transmitted by the landing gear to the structure—during landing—as a function of duration data corresponding to the reciprocal of said natural frequency.

In a preferred embodiment, while landing the aircraft and during the compression (shortening) stroke of a damper in a landing gear connected to the structure of the aircraft, the hardness of the damper is servo-controlled so that the force transmitted by the landing gear to the structure of the aircraft is at a maximum for a duration close to the period corresponding to a natural frequency of deformation of the structure of the aircraft.

Advantageously, the hardness of the damper is servo-controlled so that the ratio of the duration (D) to the period (P) is greater than 0.8 and less than 1.2; which is equivalent to the product of said duration multiplied by the natural frequency in question lying in the same range of values.

Ideally, the hardness of the damper is servo-controlled so that the ratio of the duration (D) to the period (P) is equal to 1; which is equivalent to the product of said duration multiplied by the natural frequency in question being equal to 1.

In the particular circumstance of a rotary wing aircraft of structure having a natural mode of deformation in bending (laterally or vertically) for the tail boom, the hardness of the damper is controlled, during landing at a vertical speed of approach of not less than 2 meters per second, in such a manner as to spread out the energy and/or the force transmitted by the landing gear to the structure in time over a duration close to the period calculated from the natural frequency corresponding to said natural mode of deformation of the tail boom.

The invention makes it possible to minimize the dynamic response of the structure during a landing by actively controlling the behavior of the landing gear.

The invention thus makes it possible to limit the peak forces exerted on the structure and to limit the deformations that result therefrom; under certain conditions, this decrease can reach or even exceed 40%, thereby enabling the structure to be of smaller dimensions and consequently reducing its weight, or else enabling the aircraft to have improved ability to cope with a hard landing and/or a crash landing, i.e. to increase its maximum admissible impact speed.

BRIEF DESCRIPTION OF THE DRAWINGS

Other characteristics and advantages of the invention appear from the following description which refers to the accompanying drawing that shows preferred embodiments of the invention, without any limiting character.

DETAILED DESCRIPTION OF THE PREFERRED EMBODIMENTS

The invention is based in particular on studies and tests performed on helicopters that have revealed coupling between the structure of the helicopter and its undercarriage, in particular when landing at a high vertical speed (2 meters per second (m/s)<speed<6 m/s). Under certain conditions, it appears in particular that the reaction exerted by the ground on the tire of an undercarriage and as transmitted by the undercarriage (including its oleo-strut) to the structure of the helicopter, can excite one of the natural deformation modes of the structure.

In the particular case of a helicopter, the tail boom is a structural element that is heavily stressed during landing because of its highly cantilevered configuration relative to the central structure; the moment of the inertia forces at its connection is high.

Stress recordings have shown not only that the tail boom is loaded statically by the sudden rise in force delivered by the landing gear, but that it is also loaded dynamically by a resonance phenomenon, at a natural frequency corresponding to a natural mode of deformation in bending of the tail boom.

The servo-control system of the invention serves to match the excitation of the structure by the landing gear to the natural frequency of the most critical structural element in such a manner as to minimize the peak value of the force in said structural element, thus making it possible for it to be more lightly dimensioned.

Excitation of the structure by the landing gear is controlled by spreading out the width of the force pulse transmitted by the landing gear to a greater or lesser extent.

Figure 3:
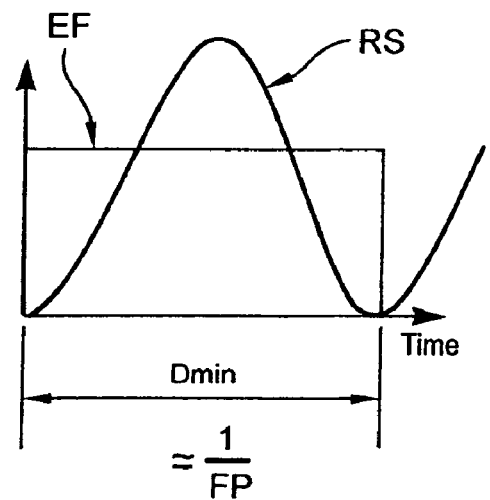
FIG. 3 is a diagrammatic timing chart showing the matching of the duration of a force "pulse" transmitted by the undercarriage, to the inverse of the natural frequency of the structure excited by the undercarriage.

The diagram of FIG. 3 plots variation in the excitation EF of the structure by the landing gear up the ordinate as a function of time along the abscissa, and also plots the response RS of the structure to said excitation.

Writing the duration of the excitation signal as D and the angular frequency of the structural response as $\omega$, the purpose of the servo-control relationship is to determine the value Dmin of the duration D that minimizes the structural response RS; the minimum response is generally obtained when the ratio $\tau = D/(2\pi/\omega)$ is equal to 1, which corresponds to the signals being in phase opposition: the excitation signal EF becomes zero simultaneously with the structural response, thereby reducing said response. Conversely, a maximum response is obtained specifically when the ratio is equal to 1/2 or 3/2: under such circumstances, the falling edge of the excitation relaunches the structural response.

By way of example, for a deformable helicopter structure presenting a natural frequency of 5 hertz (Hz), the opening of the valve is servo-controlled so as to obtain a force pulse exerted on the structure having a duration close to 200 milliseconds (ms) e.g. situated in the range 160 ms to 240 ms.

The simplified expression for the landing gear force as a function of time is of the form:

$$EF(t)=C(t).dx/dt$$

where C(t) designates the damping coefficient of the landing gear, having a value that is adjusted at each instant by the servo-control system, and where dx/dt designates the rate at which the landing gear is lengthening or shortening.

Given that the force EF is bounded by the static strength limit EFmax of the connection between the landing gear fitting and the structure of the aircraft, i.e. the point where force is injected into the structure, and given that speed is measured continuously by means of a sensor, the servo-control computer seeks in real time the value C(t) that will give the ratio $\tau$ that is the closest to 1 while still complying with the constraint EF<EFmax.

In a variant, the expression for EF(t) can include additional terms for taking account specifically of the stiffness and damping characteristics of the tire and of the gas in the landing gear damper. The general expression for EF(t) then has the following form;

$$EF(t)=C(t).dx/dt+Kx$$

where K is a stiffness term (tire, gas, . . . ).

The system of the invention for active control of landing gear serves to servo-control the curve of the force EF transmitted by the landing gear to the conditions of landing by using a preestablished relationship adapted to the particular conditions of the present landing; the relationship is devised to limit the peak value of the response RS of the deformable structure, and to spread out the energy of the impact over time.

Figure 1:
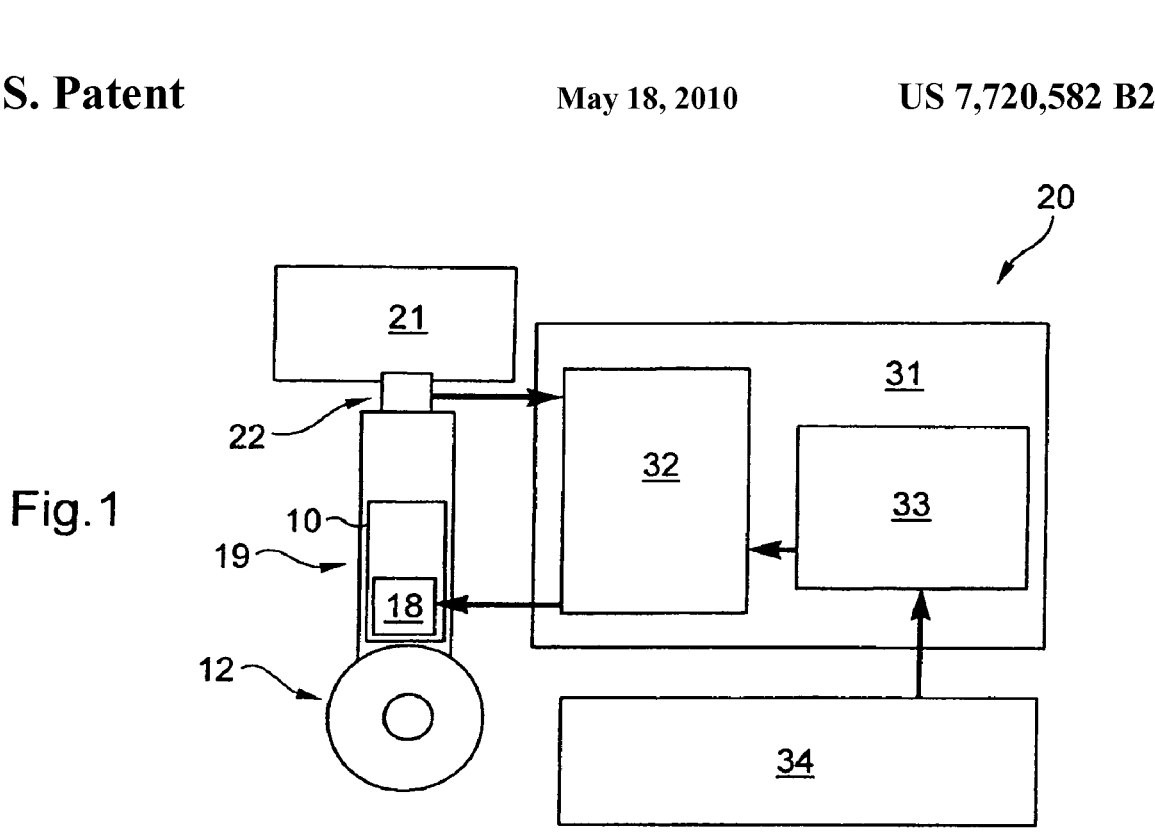
FIG. 1 is a diagram of an active control system for an undercarriage in accordance with the invention.

To implement such active control, it is preferred to have the means shown in FIG. 1, i.e.:

a) a memory 34 for storing memorized and/or measured data defining the "landing configuration": landing conditions (trim, vertical speed, hovering, . . . ), mass and center of gravity of the aircraft, characteristics of the landing gear (position, stiffness, linkage, . . . );

b) a sensor 22 for measuring the forces exerted by the landing gear on the structure 21 of the helicopter during landing, and/or a sensor responsive to the compression rate of the damper;

c) a computer 31, 32, and 33 serving to select or to generate a relationship (force =f(t)) satisfying the condition EF<EFmax and adapted to the landing parameters specific to the current flight, and also to servo-control the hydraulic throttling in compliance with said relationship; and d) an actuator, driven by the computer, for the purpose of modulating the damping characteristics of the landing gear.

When the servo-control relationships are predetermined, they are stored in the memory 34; under such circumstances, a selector 33 in the computer 31 responds to information delivered thereto by the memory 34, and selects the relationship that is best adapted to the landing parameters of the moment.

In a variant, a servo-control relationship may be generated by a module (not shown) for computing the servo-control relationship and that is implanted in the computer.

A servo-control module 32 may serve to control the actuator 18 on the basis of force measurements delivered by a sensor 22, while complying with the selected servo-control relationship.

The actuator includes a control member acting directly on the damping characteristics of the landing gear (by throttling the fluid), and means for driving said control member under the control of the computer serving to amplify the electrical control signal and to convert it into mechanical movement of the above-mentioned member.

The control member may be an orifice of variable section, of the diaphragm type. However, the stresses internal to the landing gear may make it difficult to dimension such a member; in which case it may be preferable to use a member of the valve type, which closes to a greater or less extent an orifice for throttling the flow of oil from one chamber of the damper to another. The member is driven by an electric motor under the control of the computer.

In a variant, the member may be driven hydraulically since the movement of compressing the landing gear during landing causes the damping hydraulic fluid to move: this "free" energy source is available; the drive means is then of the servo-control type, with a distributor valve controlled electrically by the computer.

In another variant, instead of modifying the fluid throttling orifice, it is possible to use a fluid whose viscosity characteristics are modified, in particular a magneto-rheological fluid of viscosity that can be controlled by means of an electric current.

The measurement, acquisition, and/or recording—in a memory of the computer system 31 to 34 on board the aircraft in question—of the parameters relating to the current landing and of the parameters specific to the aircraft in question can be implemented in particular by using the systems described in U.S. Pat. Nos. 4,312,042 and 3,426,586; in order to measure the forces transmitted to the landing gear by the axle and transmitted to the structure of the aircraft by the landing gear, it is possible to use inclinometers or strain gauges JDC1, JDC2 secured upstream and downstream from the damper 10.

Figure 2:
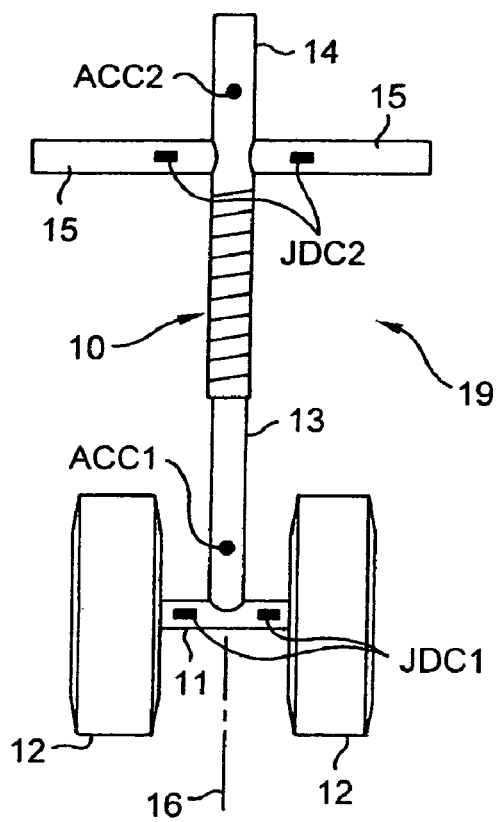
FIG. 2 shows an example of how a sensor for measuring the force transmitted to the structure by an undercarriage can be located.

The position and/or speed of compression (and conversely of expansion) of an oleopneumatic damper 10 of the landing gear 19 along the longitudinal axis 16 can be determined from the signals delivered by two accelerometers (ACC1 and ACC2, FIG. 2) secured respectively to parts or assemblies interconnected by the damper 10: a part 13 connecting an axle 11 (carrying wheels 12) to the bottom end of the damper 10, and also parts 14, 15 (shown in part and diagrammatically) connecting the top end of the damper 10 to the main structure of the aircraft (not shown).

The invention claimed is:

1. A method of controlling the hardness of a damper of an aircraft landing gear, the aircraft including a tail boom deformable with a natural mode of deformation at a natural frequency (FP) corresponding to said natural mode of deformation, the method comprising adjusting the hardness during compression of the damper as a function of said natural frequency; and measuring a force transmitted by the landing gear to the tail boom, and adjusting said hardness as a function of the measured transmitted force.

2. The method according to claim 1, further comprising measuring a rate of compression of the damper, and adjusting said hardness as a function of the measured rate of compression.

3. The method according to claim 1, wherein the damper comprises two fluid chambers communicating via a duct fitted with a valve of variable aperture, and further comprising varying the aperture of the valve to adjust the hardness of the damper.

4. The method according to claim 1, further comprising adjusting the hardness of the damper to spread out the energy of a landing impact over a duration (D) close to the reciprocal (Dmin) of said natural frequency.

5. The method according to claim 1, further comprising at least one of selecting or generating a servo-control relationship for opening a valve of variable aperture of the damper as a function of parameters for the current landing.

6. The method according to claim 5, in which in order to select or generate said relationship, further comprising using recorded and/or measured data related to the trim of the aircraft, the vertical speed of the aircraft, the lift of the aircraft, the mass of the aircraft, the position of the center of gravity of the aircraft, the position of the landing gear of the aircraft, the stiffness of the landing gear of the aircraft, and the drive linkage of the landing gear of the aircraft.

7. Apparatus that controls the hardness of a damper of landing gear of an aircraft having a tail boom presenting a natural mode of deformation and a natural frequency of deformation (FP) corresponding to said natural mode of deformation, the apparatus includes a system configured to adjust the hardness of the damper during compression of the damper as a function of duration data (Dmin) corresponding to the reciprocal of said natural frequency: and a sensor responsive to the forces exerted on the landing gear, configured to deliver signals or data to the adjustment system, which are representative of the forces exerted on the landing gear.

8. Apparatus according to claim 7, including a sensor (JDC2, 22) responsive to the forces exerted by the landing gear on the tail boom, and configured to deliver signals or data to the adjustment system, which are representative of the forces exerted by the landing gear.

9. Apparatus according to claim 7, including a sensor (ACC1, ACC2) responsive to the position or the rate of compression of the landing gear and configured to deliver signals or data to the adjustment system, which are representative of the position or the rate of compression of the landing gear.

10. Apparatus according to claim 7, in which the damper comprises first and second chambers and a variable aperture throttling member configured to control the rate of flow of fluid from the first chamber to the second chamber, and in which the system configured to adjust the hardness of the damper comprises: a memory configured to store landing configuration data selected from landing condition data, mass data and center of gravity data for the aircraft, and data characteristic of the landing gear; at least one sensor responsive to the rate of contraction of the damper, the sensor delivering a rate of contraction signal; and data processor means coupled to the data storage memory, to the measurement sensor, and to the throttling member, the data processor means serving to select or generate a servo-control relationship for the aperture of the throttling member adapted to the landing configuration data specific to the current flight, and also to servo-control the aperture of the throttling member in application of said relationship and as a function of the contraction rate signal delivered by the sensor, so as to adjust the hardness of the damper while it is being compressed, in such a manner that the force transmitted by the landing gear to the tail boom of the aircraft is at a maximum for a duration (D) close to said duration data (Dmin).

11. Apparatus according to claim 10, further comprising a sensor configured to measure the forces exerted by the landing gear on the tail boom of the aircraft while landing, the sensor delivering a force signal, and in which said data processor means is connected to the force measuring sensor and servo-controls the throttling member also as a function of the force signal.

12. Apparatus according to claim 10, in which said at least one sensor responsive to the rate of contraction of the damper comprises two accelerometers secured respectively to a part connecting an axle to the damper, and to a part of the tail boom of the aircraft.

13. Apparatus according to claim 7, in which the damper has a first chamber and a second chamber and a variable aperture throttling member configured to control the flow of a fluid from the first chamber to the second chamber, and in which the system configured to adjust the hardness of the damper comprises: a memory configured to store landing configuration data selected from landing condition data, data concerning the mass and the center of gravity of the aircraft, and data characteristic of the landing gear; a sensor configured to measure the forces exerted by the landing gear on the tail boom of the aircraft during a landing, the sensor delivering a force signal; and data processor means coupled to the data storage memory, to the measurement sensor, and to the throttling member, the data processor means serving to select or generate a servo-control relationship for the aperture of the throttling member adapted to the landing configuration data specific to the current flight, and also serving to servo-control the aperture of the throttling member in application of said generation and as a function of the force signal delivered by the sensor, so as to adjust the hardness of the damper while it is being compressed, to ensure that the force transmitted by the landing gear to the tail boom of the aircraft remains at a maximum for a duration (D) close to said duration data (Dmin).

* * * * *